United States Patent
Nochta et al.

(10) Patent No.: US 7,685,089 B2
(45) Date of Patent: Mar. 23, 2010

(54) METHOD FOR FAST DECISION-MAKING IN HIGHLY DISTRIBUTED SYSTEMS

(75) Inventors: Zoltan Nochta, Karlsruhe (DE); Stephan Haller, Karlsruhe (DE)

(73) Assignee: SAP AG, Walldorf (DE)

( * ) Notice: Subject to any disclaimer, the term of this patent is extended or adjusted under 35 U.S.C. 154(b) by 371 days.

(21) Appl. No.: 11/441,513

(22) Filed: May 26, 2006

(65) Prior Publication Data
US 2007/0005547 A1 Jan. 4, 2007

(30) Foreign Application Priority Data
Jun. 13, 2005 (EP) ................. 051051464

(51) Int. Cl.
*G06F 15/00* (2006.01)
(52) U.S. Cl. .............. 706/62; 706/20; 706/21; 706/45; 713/155; 713/182; 713/183; 713/184; 713/185; 713/186
(58) Field of Classification Search .......... 706/8, 706/20, 21, 45–47; 709/204, 213, 217; 713/155, 713/164–172, 182–186, 189–194
See application file for complete search history.

(56) References Cited

U.S. PATENT DOCUMENTS

| | | | | |
|---|---|---|---|---|
| 5,280,527 A | * | 1/1994 | Gullman et al. | 713/184 |
| 5,361,199 A | * | 11/1994 | Shoquist et al. | 705/26 |
| 6,421,676 B1 | * | 7/2002 | Krishnamurthy et al. | 707/102 |
| 7,225,343 B1 | * | 5/2007 | Honig et al. | 713/194 |
| 7,249,177 B1 | * | 7/2007 | Miller | 709/225 |
| 7,305,562 B1 | * | 12/2007 | Bianco et al. | 713/186 |
| 7,310,042 B2 | * | 12/2007 | Seifert | 340/5.53 |
| 7,367,049 B1 | * | 4/2008 | Robinson et al. | 726/2 |
| 2003/0208697 A1 | * | 11/2003 | Gardner | 713/202 |
| 2004/0254903 A1 | * | 12/2004 | Heckerman et al. | 706/46 |
| 2004/0267897 A1 | * | 12/2004 | Hill et al. | 709/217 |
| 2006/0010090 A1 | * | 1/2006 | Brockway et al. | 706/46 |
| 2006/0155664 A1 | * | 7/2006 | Morikawa et al. | 706/47 |

FOREIGN PATENT DOCUMENTS

EP    1394706    3/2004

OTHER PUBLICATIONS

Kingma, Y., "EP Search Report", (Jan. 26, 2006).

* cited by examiner

*Primary Examiner*—David R Vincent
*Assistant Examiner*—Omar F Fernandez Rivas
(74) *Attorney, Agent, or Firm*—Schwegman, Lundberg & Woessner, P.A.

(57) ABSTRACT

An embodiment includes a prediction system for initiating a data transfer to a decision system. The prediction system is configured to identify a decision, the decision being a result of a computation of the decision system according to a set of predefined rules and input data. The prediction system is further configured to identify predicted input data representing a portion of the input data and to initiate a transfer of the predicted input data to the decision system prior to the computation of the decision.

20 Claims, 5 Drawing Sheets

METHOD FOR FAST DECISION-MAKING IN HIGHLY DISTRIBUTED SYSTEMS

CLAIM OF PRIORITY

The present patent application claims the priority benefit of the filing date of European Application (EPO) No. 05105146.4 filed Jun. 13, 2005, the entire content of which is incorporated herein by reference.

1. Technical Field

Embodiments generally relate to the field of electronic data processing and more particularly to providing data in distributed systems.

2. Background and Prior Art

Distributed systems are individual systems that can exchange data. A set of the distributed systems may have specific functions and require data from a further system to accomplish the specific functions. The distributed systems may have one central system that provides data to further systems. In an example, the central system may be an application server administrating human resource data and the further systems control an access according to the human resource data. In a further example, the distributed systems may have similar configurations but store different data and accomplish different tasks.

The distributed systems may be connected in different ways. It may be that the systems are connected through a direct link to the further systems or that most of the systems are only connected through a direct link to one system. Furthermore, it may be that two systems are connected for a limited time or that a bandwidth of a link between the two systems is time dependent.

A decision system of the distributed systems may have a task to compute a decision. The decision may be a specific task or a part of a specific task. Computing the decision is done according to input data and predefined rules. The input data may include remote data that is provided to the decision system from a further system, that is, a source system of the remote data that is different from the decision system. The predefined rules may for example be instructions of a computer program. In an example, the instructions may identify portions of the input data, check if the portions fulfil requirements, and compute a decision based on results of the checks. For example, the decision may have a result to grant an identified person access to a specific room.

DETAILED DESCRIPTION

Figure 1:
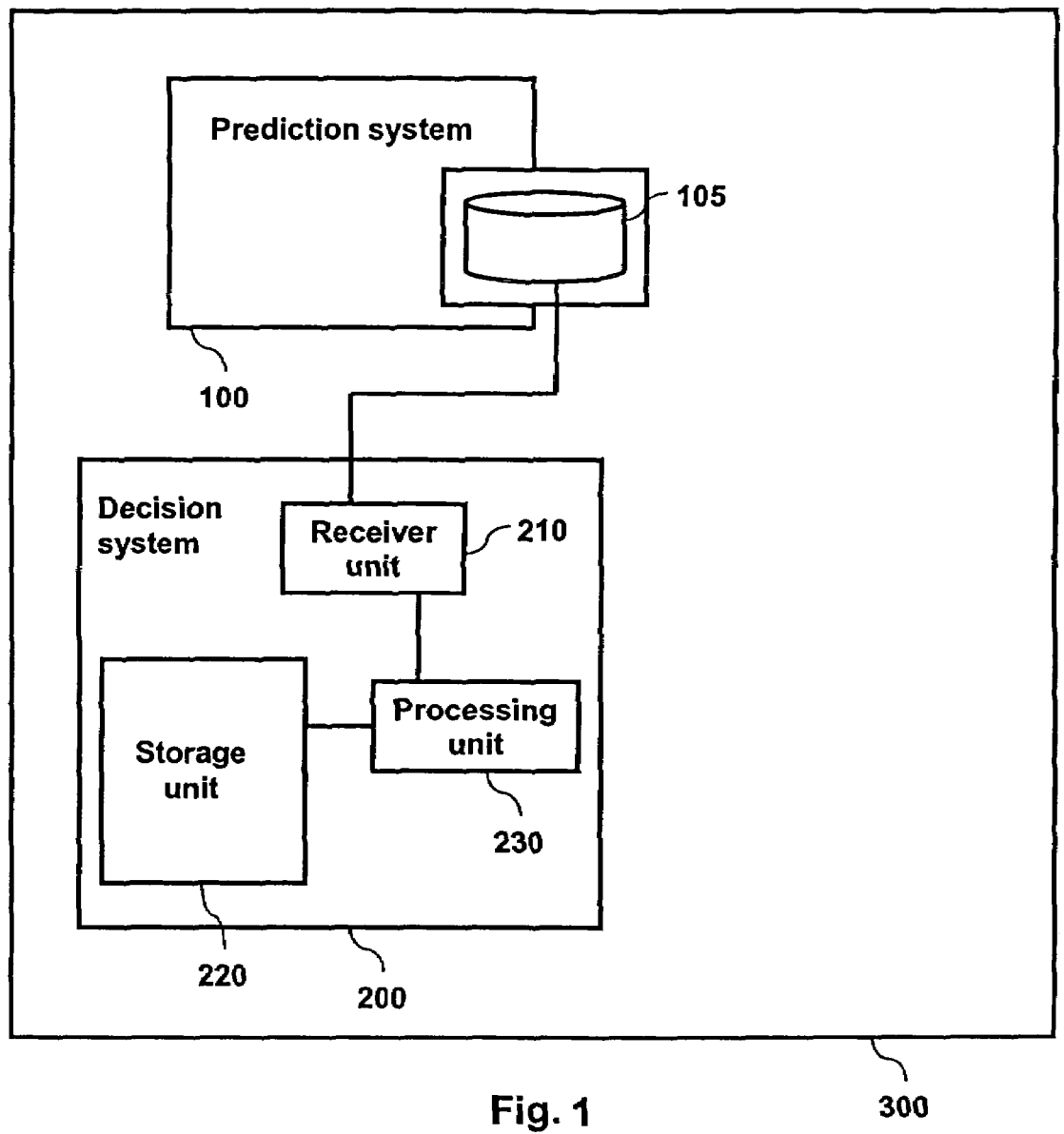
FIG. 1 is a block diagram of a composite system which includes example embodiments of a prediction system and a decision system.

The decision system of the distributed systems may have the task to compute a decision according to input data that include the remote data. It may be desired that the decision is computed in a fast way, that is, the decision system computing the decision does not wait for receiving a portion of the remote data. This is achieved by using an available bandwidth of a link between the decision system and the system providing the remote data so that the portion of the remote data is provided prior to computing the decision. Furthermore, it may be desired that the decision is computed in a reliable way, that is, by using a portion of the remote data that is accessible for the decision and that is likely to be up to date.

An example embodiment addresses a prediction system that may be configured to identify the decision and predicted input data and to initiate a transfer of the predicted input data to the decision system. The prediction system may initiate the transfer prior to a computation of the decision, that is, the predicted input data is accessible to a decision system before the decision system computes the decision. This may allow for a faster computing of the decision than in the case that the decision system is required to request the predicted input data and to wait that the predicted input data is provided and sent to the decision system. Furthermore, the decision may be computed in a reliable way, i.e. the prediction system may be in a position to initiate the transfer of the predicted input data that is accessible for computing the decision and that is likely to be up to date. Generally, it may be difficult to make sure in the distributed systems that the predicted input data provided is up to date because the predicted input data may be changed shortly prior to computing the decision. In such a case it may not be possible to provide predicted input data which is up to date. However, the likelihood of such a case may be reduced with the prediction system. This may also be the case when the decision system is connected to the remote system through a link with a low bandwidth. Furthermore, the decision system may not have to send a request using further computing power and increasing a load of a connection. The prediction system may also schedule the transfer when a load of the connection used for the transfer or a load of the system providing the predicted input data is small.

A further example embodiment addresses the decision system. The decision system may be configured to receive the predicted input data prior to computing the decision, store the predicted input data, and compute the decision according to the predicted input data. Therefore, the decision system may process the predicted input data forwarded to the decision system so that the predicted input data may be available for computing the decision without a delay. This may allow for a reliable and fast computing of the decision because the decision system can use the forwarded predicted input data without waiting for receiving the predicted input data during computing the decision. The further embodiment may be faster than in the case that the decision system starts with computing the decision, then identifies the input data, and requests a transfer of the predicted input data. The decision may be also more reliable than in the case that a fixed time limit for computing the decision forces the decision system to compute the decision without using the predicted input data. In such a case the decision system may compute the decision without the predicted input data because requesting the predicted input data may take more time than is available according to the fixed time limit. Accordingly the result of the decision may be not reliable, that is, may be likely to be wrong considering the predicted input data. The forwarded predicted input data may be more reliable than in the case that outdated predicted input data is used for the decision, for example, by accessing data stored by the decision system for a long period of time. Furthermore, the further embodiment may be more memory efficient than in the case that the decision system buffers a lot of data. The reason may be that the predicted input data is specific to the decision and is not required to be stored for a long period of time.

A further example embodiment addresses a composite system that includes the prediction system and the decision system. Accordingly, the composite system may provide a fast and reliable way of computing the decision.

A further example embodiment addresses a computer implemented method that includes operations of the prediction system and the decision system. Accordingly, the method may provide a fast and reliable way of computing the decision.

Further example embodiments address computer program products causing computer systems to execute operations of the prediction system or the decision system in accordance with an example embodiment. Therefore, the computer program products share characteristics of the computer implemented method.

Aspects of embodiments will be realized and attained by means of the elements and combinations particularly pointed out in the claims. It is to be understood that both the foregoing general description and the following detailed description are exemplary and explanatory only and are not restrictive of embodiments as described.

The following examples and descriptions are meant to illustrate embodiments and are not intended to limit the scope of the embodiments.

FIG. 1 is a block diagram of a composite system 300 which includes example embodiments of a prediction system 100 and a decision system 100. Lines between two systems represent links configured to connect the respective systems, that is, to exchange data between the respective systems.

The prediction system 100 may be configured to identify a decision computed by the decision system 200. The decision may be computed according to a set of predefined rules and input data which include predicted input data provided by a data source 105. In a further example, the predicted input data may also be provided by a plurality of data sources belonging to one or more source systems. The source system 105 may be a part of the prediction system 100 or in a further example may be a part of a further source system. The prediction system 100 may be also configured to identify predicted input data and to initiate a transfer of the predicted input data to the decision system 200. The transfer of the predicted input data may be initiated prior to the decision system computing the decision. Therefore, the decision system may be not required to send a request for the predicted input data. In the example, the predicted input data is identical to remote data that is provided by a system different from the decision system. However, in a further example the predicted input data may only be a portion of the remote data that is sent to the decision system. In the example, the transfer of the predicted input data may be further scheduled so that transfer is accomplished prior to starting to compute the decision. In the example, the data source 105 is a data base that is a part of the prediction system. The prediction system may be a central system that provides data for most processes of an enterprise. In the further example, the central system may access data from an external data source 105 that is provided for example by a data base server. In the example, the central system supports a process by providing data from the data source 105. The prediction system may be in a position to predict a future process step that is related to the decision by monitoring process steps of the process. In the further example, the central system may further predict that the decision system computes the decision and that a portion of the predicted input data is located at a specific remote system and a further portion of the predicted input data is accessible in the data base 105 of the central system.

In the example illustrated in FIG. 1, the prediction system may further identify the decision system and the data source 105. The prediction system may request the predicted input data from the data source to be able to send the predicted input data to the decision system. In the example, the predicted input data is all the data that is sent to the decision system. In a further example, the predicted input data may be only a portion of the remote data that is sent to the decision system. In an example, the prediction system may support a maintenance process of servers and predicts that on the first working day of the next month a person enters a server room for maintenance of the servers. The prediction system may then send the predicted input data that specify a group of employees allowed to enter the server room to the decision system that controls an entrance of the server room. The sending of the predicted input data may take place in the night prior to the first working day when the traffic of the intranet of the enterprise is low and the prediction system is not busy with a further task.

The decision system 200 may include a receiver unit 210 configured to receive the predicted input data and a storage unit 220 configured to store the predicted input data. Accordingly, the predicted input data may be available when the decision is computed by a processing unit 230 configured to compute the decision. The receiver unit 210 and the storage unit 220 are communicatively coupled with the processing unit 230 to exchange data. The storage unit may for example include a data base to store the received predicted input data. The data base may be configured to store many portions of remote data together with further data. In a further example, the storage unit may include a random access memory (RAM) device with a small storage capacity.

The decision system may further include a sensor unit configured to provide local data to the processing unit. The decision system may require the local data for computing the decision, that is, the input data of the decision further include the local data. In a further example, the decision system may also include a plurality of sensor units providing the local data. In a maintenance example of the person entering the server room, the sensor unit may be a card reader configured to read cards that identify owners of the card. In a further example, the decision system may be configured to use previous predicted input data stored in the storage unit to compute the decision. The previous predicted input data have been used previously to compute a previous decision, that is, a decision prior to the predicted decision. In the maintenance example, the decision system may have stored data specifying a previous group of employees allowed to enter the server room from a previous maintenance of the server room. In this case, the decision system may not require the predicted input data that specify the group. Instead, the decision system may use the data specifying the previous group stored by the storage unit and use the predicted input data only in case the predicted input data have been received. In an embodiment of the prediction system, the prediction system may not initiate a transfer with the predicted input data specifying the group in case the previous group is identical to the group.

In the example, the storage unit may be configured to erase a specific portion of the stored data. An erasure of the specific portion may be required because a limited storage space of the storage unit 220 may not be able to store future data. The erasure may be according to one or more erasure conditions. The specific portion may, for example, be erased upon using the specific portion for computing the decision, that is, a stored portion is used only for one decision and following that the stored portion is erased. It may also be possible that storing a new portion requires erasing a first portion of the stored data and the first portion is a portion that has been stored for a longest period of time in the storage unit, that is, the first data have been stored for a longer period of time than further portions of the stored data. In further examples, an expired portion may be erased by the storage unit after a specific period of time and a further expired portion may be erased upon reaching an expiration date which is associated to the further expired portion. It may also be possible that the processing unit initiates the erasure of the specific portion according to any one of the erasure conditions.

The decision system may be configured to compute the decision when a missing portion of the remote data is not accessible to the processing unit. In the maintenance example, it may be that a card is read by the card reader that belongs to an external person, that is, the person is not an employee of the enterprise. The processing unit is missing data for the decision if the external person is allowed to enter the server room. The processing unit may for example decide to let the external person enter the server room because the external person is accompanied by an employee that is a member of the specified group allowed to enter the server room. The processing unit may be configured to request data including a result of the decision from the prediction system. However, the processing unit may also be configured to request a required portion of the remote data from the prediction system and to compute the decision upon receiving the required portion. In the maintenance example, the processing unit may therefore request to receive a list of external persons given permission to enter the server room. The processing unit may wait until it receives the list and then continue with computing the decision by comparing the owner of the card with the names of the external persons on the list. According to a result of the decision the decision system may let the external person enter the server room or not.

In a further example for an embodiment, the prediction system may identify the decision but not the decision system. In the maintenance example, the prediction system may for example identify the decision to let one or more persons enter the server room. However, the prediction system may not know where the server room is and which system is the decision system. In this case the decision system may for example transfer the predicted input data to a system that is able to route the predicted input data to the decision system, for example, to a device located next to the entrance of the server room. In case that the data source 105 is part of a further system the prediction system may also initiate the transfer of the predicted input data without identifying the further system. The prediction system may for example send the request for the predicted input data to an administration system that knows which system can provide the predicted input data and that can route the request to the further system.

Figure 2:
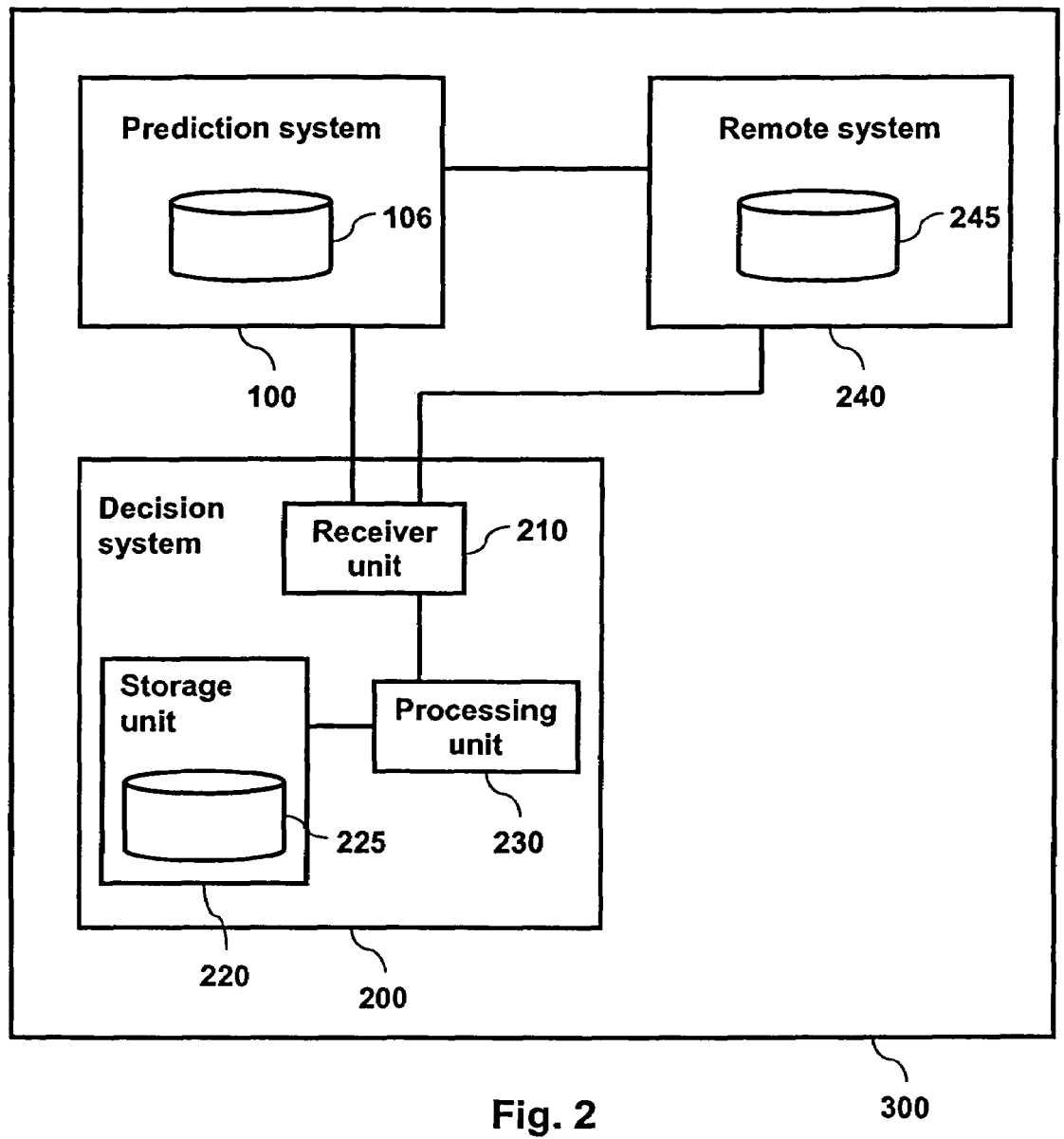
FIG. 2 is a block diagram of a second composite system which includes further example embodiments of the prediction system, the decision system, and a remote system.

FIG. 2 is a block diagram of a second composite system 300 which includes further example embodiments of the prediction system 100, the decision system 200, and a remote system 240. The second example is different from the previous example of FIG. 1 in a few aspects. The second example may include the remote system 240 which is communicatively coupled to the prediction system and the decision system. Furthermore, in the second example, the prediction system may include a data source 106 which may for example be a data base or a RAM memory. The storage unit 220 of the decision system may have also a data source 225 which also may be a data base or a RAM memory.

In the second example, the prediction system may identify the predicted input data that is provided by the data source 245 of the remote system 240. The prediction system may send a request for the predicted input data to the remote system. In a further example with more than one remote system, the prediction system may also send a plurality of requests to a plurality of remote systems and each remote system of the plurality provides an individual predicted input data. In the further example, the individual predicted input data together may represent the remote data that is sent to the decision system. In the second example, the remote system 240 may execute a search in a data base 245 upon receiving the request from the prediction system. The search result includes the predicted input data and the predicted input data is sent directly to the decision system. In a further example, the predicted input data may be sent first to the prediction system which later on forwards the predicted input data to the decision system. In a yet further example with more than one remote system, the prediction system may be configured to send a request to the remote system so that the remote system sends the individual predicted input data to the prediction system. The prediction system may send further requests for further individual predicted input data to further remote systems. The prediction system may store the received individual portions and forward contents of the individual portions to the decision system in a single transfer. In the second example, the prediction system may identify a time interval in which the decision is computed and a further time interval in which the transfer of the predicted input data is scheduled.

In a further example, the composite system 300 may include distributed systems with a configuration that is similar in one or more aspects. The prediction system may include a central processing unit (CPU) with a memory unit and a communication unit that includes a receiver unit. The remote system and the decision system may include further CPUs with memory units and communication units that include a receiver unit. In the further example, the prediction system may administrate tasks that are given to the remote system and the decision system. Tasks of a first type may be independent of further tasks and the prediction system may give first type tasks as soon as the remote system or the decision system has finished a previous task. However, tasks of a second type may depend on results of a further task. In the example, the decision system may have to compute a decision that is identical to a task of the second type, that is, a decision task. In the further example, the decision task depends on a result of a remote task that the remote system is still working on. The prediction system may identify a portion of remote data that for example the prediction system can provide and that is also required for computing the decision of the decision task. According to an embodiment the prediction system may send the identified portion to the decision system. The decision system may not start with the decision task because the result of the remote task is not yet available. However, when the remote task is finished and the decision system has received the result of the remote task the decision system may be able to compute the decision task without receiving a further portion of remote data. This may result in a fast computing of the decision task because the processing unit of the decision system may be not required to wait for the further portion of the remote data. Therefore, an embodiment may also be used for connected CPUs within one or more computer systems, for example, for parallel processing machines, vector computers, or connected computers. Furthermore the connected CPUs may or may not access a shared memory, that is, memory units of the prediction system, the decision system and the remote system are one identical memory unit.

Figure 3:
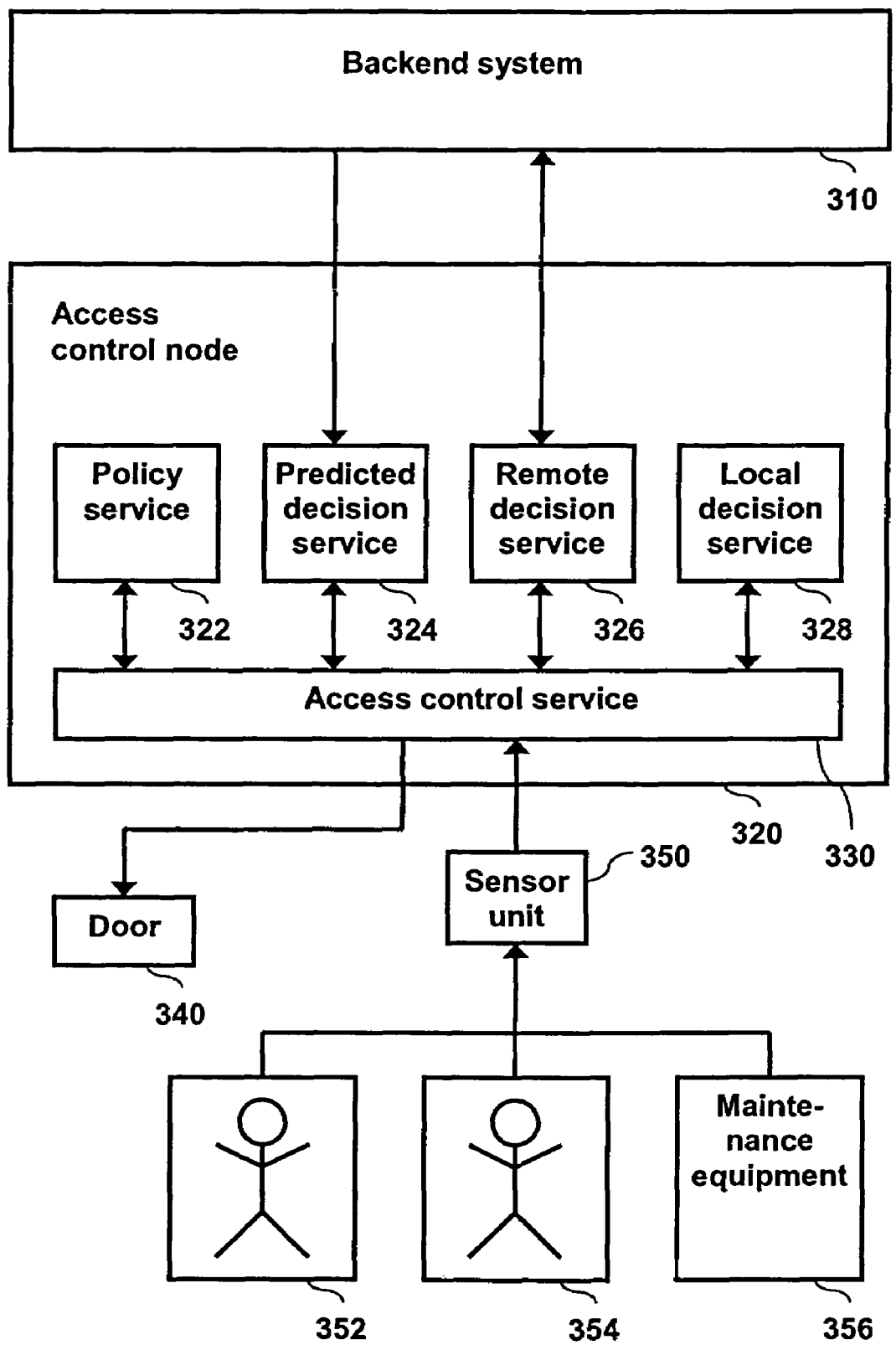
FIG. 3 illustrates details of a further example including embodiments.

FIG. 3 illustrates details of a further example including embodiments. A backend system 310 may be an example embodiment of the prediction system providing the predicted input data of the decision. The decision system may be represented by an access control node 320 which is connected to a sensor unit 350 and to a door 340. The access control node 320 may also be characterized as a local system. The access control node 320 may compute the decision if two employees 352 and 354 together with a maintenance equipment 356 are allowed to enter a sensitive area. The sensitive area may for example be an area on an off-shore oil platform. The area may be sensitive because for example a spark may lead to an explosion or a fire. The sensor unit may for example be a reader of radio frequency identifier (RFID) transponders. Each of the employees 352 and 354 may be identified according to a RFID transponder and also the maintenance equipment 356 may be identifiable by an attached RFID transponder. The decision may involve predefined rules specifying required qualifications of persons to enter the sensitive area and regulations for equipment to work with. The sensor unit 350 may be connected to an access control service 330 and may transfer the data read from the transponders to the access control service 330. The data from the transponder may be local data that is a portion of the input data of the decision. A further portion of the input data may be identical to the predicted input data that is provided by the backend system.

Generally, the set of predefined rules may include a policy service and decision services. The policy service may include selection conditions for selecting one or more of the decision services and each one of the decision services may be an independent provision for computing the decision. The decision services may include a predicted decision service which accesses the previously received and stored portion of the predicted input data and the local data. The decision service may include a local decision service which accesses the local data. Furthermore, the decision system may include a remote decision service which requests a further portion of the remote data from the prediction system, the further portion including a result of the decision. In a further example, the decision service may also request the further portion from a remote system able to provide the further portion.

In FIG. 3, according to an embodiment the access control service 330 may be connected to a policy service 322, a predicted decision service 324, a remote decision service 326, and a local decision service 328. Connections involving a service are illustrated by double arrows representing an exchange of data in both directions or are illustrated by arrows representing a transfer of data in one direction. Connections involving further elements of the figure are represented in an equivalent way. In the example, the services are elements of software architecture, each one of the services is an encapsulated set of instructions executable by the processing unit of the access control node. Accordingly, the services may be executable independently of each other with different parameters, that is, input data and output data. Furthermore, it may be possible to modify one service without affecting a further service.

In the example, the policy service 322 specifies an order of priority in which the decision services are used to compute the decision. The predicted decision service 324 may compute the decision relying on input data that include local data from the sensor and the predicted input data forwarded from the backend system prior to a request from the access control node 320. The remote decision service may compute the decision relying on a requested portion of remote data from the prediction system. The requested portion may include the result of the decision if the employees and the maintenance equipment are allowed to enter the sensitive area. For this, the remote decision service may also send identifications of the employees and the maintenance equipment to the backend system. The local decision service may compute the decision relying on local data from the sensor unit 350. The decision of any one of the services may be reported to the access control service which may give a command to open the door 340 or not to open the door 340 according to the decision.

In an example, the policy service 322 may specify priorities of the decision services as follows. The backend system may have correctly predicted the maintenance of the sensitive area of the oil platform and has initiated a transfer of the predicted input data. The predicted input data includes a list of the employees qualified to enter the sensitive area. The access control service may call the policy service for determining which one of the decision services is used for a first decision if the identified persons 352 and 354 are allowed to enter the sensitive area. The policy service may determine that the predicted decision service 324 has the highest priority for the first decision. According to the result of the policy service the access control service may use the predicted decision service for the first decision. The predicted decision service may use the local data and the received and stored predicted input data as the input data required for the first decision. According to the input data the predicted decision service may decide that the employees 352 and 354 are allowed to enter the sensitive area. Following the first decision, the access control system may use the policy service to determine the decision service to be used for a second decision. The second decision may determine if the identified maintenance equipment 356 is allowed to the sensitive area. For the second decision the policy service may also determine that the predicted decision service is used. However, input data that specify allowed equipment and that are applicable to the maintenance equipment 356 may not be accessible in the storage unit and the predicted decision service fails to compute the second decision. The reason may be that the backend system has not initiated a transfer of the equipment portion because for example the backend system has not predicted a requirement of using equipment. Following this, the policy service may determine that the local decision service is used for computing the second decision. However, accessible local data may not be sufficient for the local decision service and accordingly the local decision service fails to compute the second decision. Following this, the policy service may be used again and may determine that the remote decision service is used. The remote decision service queries the backend system to compute the second decision. This includes sending an identification of the maintenance equipment to the backend system. Upon receiving the result of the second decision from the backend system the remote decision service may transfer the result to the access control system. Prior to this, the access control system may not open the door and the sensitive area may not be entered with the maintenance equipment.

Figure 4:
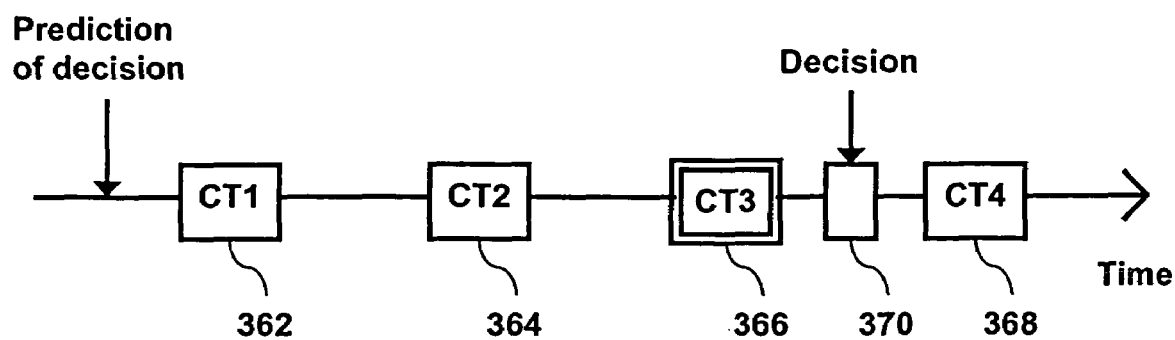
FIG. 4 is a diagram of an example of occurrences over a specific period of time

FIG. 4 is a diagram of an example of occurrences over a specific period of time. A first occurrence may be when the prediction system computes a prediction of the decision. A following occurrence may be a connect time interval 362. In the example, the connect time interval is a time interval during which the transfer of a portion of the remote data is executable because a connection to the decision system exists. It may be for example that the oil platform is only connected to the backend system during such connect time intervals. In a further example, the connection time interval may be during a night time when the traffic of an intranet is low and the prediction system and the remote system have a low work load. The connect time interval may be scheduled so that an impact on the distributed systems is small. In the figure, further connect time intervals 364, 366, and 368 follow in regular intervals. In a further example, the connect time intervals may have a varying length of time and a varying period of time in between. The decision is predicted to be computed during a decision time interval 370. According to an embodiment, the prediction system may schedule the transfer of the predicted input data during the connect time interval 366. Therefore, the decision system may be required to store the predicted input data for a shorter period of time than in the case that the transfer is scheduled during a prior connect time interval. This may save memory space of the storage unit and furthermore increases the likelihood that the predicted input data is up to date.

Figure 5:
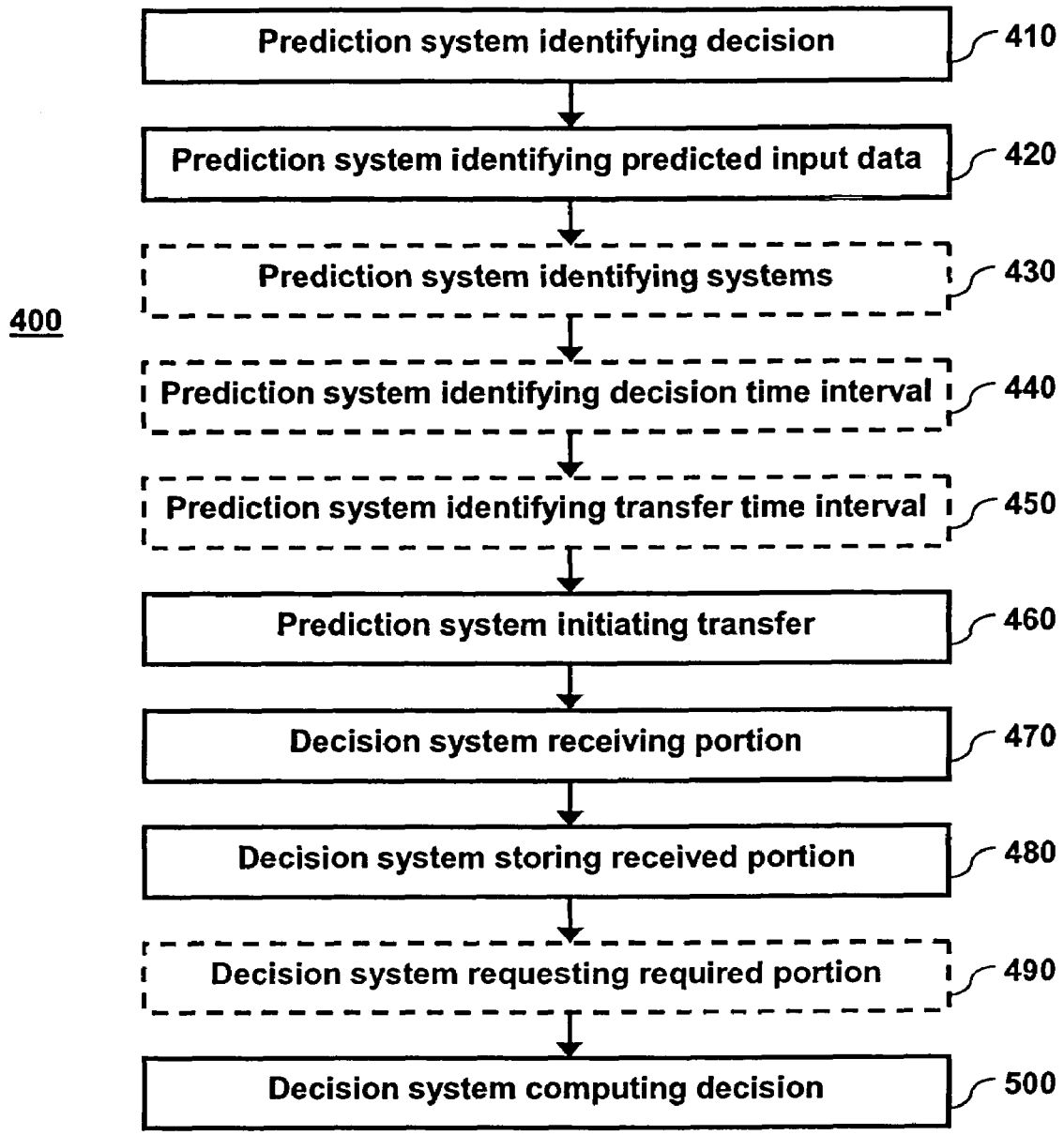
FIG. 5 is an example flow diagram according to an embodiment.

FIG. 5 is an example flow diagram according to an embodiment. The figure illustrates operations of a computer implemented method 400 for computing the decision. Optional operations of the method 400 are indicated by boxes with dashed lines. An operation may include the prediction system identifying 410 an occurrence of the decision. It may follow the prediction system identifying 420 the predicted input data. A following operation may include identifying 430 the decision system. In case the predicted input data originate from a remote system that is different from the prediction system the following operation may include prediction system further identifying the remote system. Following operations may include identifying 440 the time interval in which the decision occurs and identifying 450 the further time interval in which the transfer of the predicted input data is scheduled. It may follow the prediction system initiating 460 the transfer of the predicted input data from the data source providing the predicted input data to the decision system. Following operations may be the decision system receiving 470 the predicted input data and storing 480 the received predicted input data. A following optional operation may include the decision system further requesting 490 a required portion of the remote data comprising a result of the decision. In the example, it follows the decision system computing 500 the decision using the predicted input data. Computing 500 the decision may include receiving the required portion and using the received result of the decision to derive the result of the decision. In a further example, the input data may further comprise local data which is accessible to the decision system, for example, through a sensor unit, to which the decision system is coupled. In a yet further example, the decision system may further access a further portion of the remote data that has been stored previously for computing a previous decision and the decision system may compute the decision using the further portion. In a further example, the decision system may execute an optional operation of computing the decision using a missing portion of the remote data which is not accessible to the decision system.

Further examples for using example embodiments include checking immigration at points of immigration. The prediction system may be a central computer which is informed about persons for example on an airplane expected at a point of immigration. Depending on for example the nationality of the persons the prediction system may forward predicted input data including nationality specific regulations. At the point of immigration the decision system may for example receive local data from an immigration officer interviewing one of the persons. The decision system may use the local data and the received remote data to decide if the person is allowed to immigrate or if for example a further security check is required. The decision may be computed in a fast way because no further remote data may be required from the central system.

A still further example may include distributed information technology (IT) systems of an enterprise to which employees may logon. The logon procedure may include an access control check that requires remote data from a central system. In an example, the decision may be if an identified person is allowed to logon to a specific application program. The decision may depend on the identified person belonging to a specific group of employees, for example, to human resource manager. Identifying a person may include that the person enters an employee number and a password. Identifying a person may be done by a security system. However, the security system may not be configured to decide which employees have access to which application programs. The employee number and the password may be considered as local data of the decision. The remote data may for example include information if an employee of the enterprise belongs to the specific group. The prediction system may predict for example that a group of persons has scheduled a meeting in a meeting room and desires to access the specific application program from the meeting room. The prediction system may initiate the transfer of predicted input data that for example include for each person of the group if the person belongs to the specific group. The decision system which is identical to the computer system in the meeting room may then use the received predicted input data and the local data to compute the decision. The decision may result in granting the identified person an access to the application program or not granting the access to the application program depending on if the identified person belongs to the specific group.

The invention claimed is:

1. A composite system to increase a computational speed of decision making in a distributed system, the composite system comprising:
   a prediction system configured to identify and anticipate a decision to be made prior to a computation of the decision, the prediction system further configured to identify a set of predicted input data representing at least a portion of available input data needed to make the decision and initiate a transfer of the set of predicted input data prior to a computation of the decision, the prediction system being further configured to identify a time interval in which the transfer of the set of predicted input data is scheduled;
   a data source communicatively coupled to the prediction system and configured to provide at least a portion of the set of predicted input data; and
   a decision system communicatively coupled to the prediction system to receive and process the set of predicted input data prior to a computation of the decision, the decision system having an input storage buffer configured to store the set of predicted input data from the prediction system and to compute the decision based upon at least the predicted input data and a set of predefined rules.

2. The composite system of claim 1, wherein the prediction system is further configured to identify a remote system to provide the predicted input data and to initiate the transfer of the set of predicted input data to the decision system by sending a request to the remote system.

3. The composite system of claim 1, wherein the prediction system is further configured to identify a remote system to provide the predicted input data and to initiate the transfer of the set of predicted input data to the prediction system by sending a request to the remote system and, subsequently, to send the received set of predicted input data to the decision system.

4. The composite system of claim 1, wherein the prediction system is further configured to identify an additional time interval in which the decision is computed.

5. The composite system of claim 1 wherein the decision system further comprises: a receiver unit configured to receive the set of predicted input data.

6. The composite system of claim 1 wherein the decision system further comprises a sensor unit configured to provide local data to the-decision system.

7. The composite system of claim 1 wherein the set of predefined rules is stored on the decision system and comprises a policy service and one or more decision services, the policy service comprises selection conditions to select at least one of the one or more decision services and each one of the one or more decision services is an independent provision to compute the decision; the one or more decision services comprising:
- a predicted decision service configured to access the stored set of predicted input data and any local data;
- a local decision service configured to access the local data; and
- a remote decision service configured to request additional input data from an additional system, the additional input data comprising a result of the decision.

8. The composite system of claim 1 wherein the decision system is further configured to use, in making the decision, previous predicted input data stored in the input storage buffer from a prior decision.

9. The composite system of claim 1 wherein the input storage buffer is further configured to erase a portion of any stored data according to any one of the following erasure conditions:
- a stored portion is erased upon using it for computing the decision,
- first portion that has been stored for a longest period of time in the storage unit is erased because available memory capacity is insufficient to store new predicted input data,
- an expired portion is erased after a specific period of time,
- a further expired portion is erased upon reaching an expiration date which is associated to the further expired portion.

10. The composite system of claim 1 wherein the decision system is further configured to compute the decision when a missing portion of the set of predicted input data is not accessible to the decision system.

11. The composite system of claim 1 wherein the decision system is further configured to request required input data needed to make the decision from an additional system and to compute the decision upon receiving the required input data.

12. A method to anticipate a requirement for input data used to calculate a decision in a distributed system, the method comprising:
- anticipating, by a prediction system component of the distributed system, an upcoming calculation of the decision to be made prior to a computation of the decision;
- identifying a set of predicted input data representing at least a portion of available input data within the distributed system, the available input data being selected from a set of data needed to make the decision;
- initiating a transfer of the set of predicted input data from the prediction system component to a decision system component within the distributed system;
- identifying, by the prediction system component, a time interval in which the transfer of the set of predicted input data is scheduled;
- receiving, by the decision system component, the set of predicted input data;
- storing the received predicted input data; and
- computing the decision within the decision system component at least partially based upon the received predicted input data.

13. The method of claim 12 further comprising:
- identifying the decision system prior to initiating the transfer of the predicted input data; and
- identifying whether a remote system within the distributed system provides at least a portion of the predicted input data.

14. The method of claim 12 further comprising identifying whether the predicted input data further comprises any local data accessible by the decision system.

15. The method of claim 12 further comprising identifying an additional time interval in which the decision is scheduled to occur.

16. The method of claim 12 further comprising:
- accessing any previously stored predicted input data; and
- computing the decision using the previously stored predicted input data.

17. The method of claim 12 further comprising computing the decision without using any remote data that are not accessible to the decision system.

18. The method of claim 12 further comprising requesting further input data comprising a result of the decision.

19. A processor-readable storage medium storing instructions that, when executed by a processor, causes the processor to perform a method to anticipate a requirement for input data used to calculate a decision in a distributed system, the method comprising:
- identifying, in a prediction system component of the distributed system, an upcoming occurrence of the decision, the decision being computed by a decision system component of the distributed system according to a set of predefined rules and input data, the input data being selected from a set of data needed to make the decision;
- identifying predicted input data prior to a computation of the decision, the predicted input data representing at least a portion of the input data;
- initiating a transfer of the predicted input data from the prediction system component to the decision system component; and
- identifying, by the prediction system component, a time interval in which the transfer of the set of predicted input data is scheduled.

20. A processor-readable storage medium storing instructions that, when executed by a processor, causes the processor to perform a method to anticipate a requirement for input data used to calculate a decision in a distributed system, the method comprising:
- anticipating, by a prediction system component of the distributed system, an upcoming calculation of the decision to be made prior to a computation of the decision;
- identifying a set of predicted input data representing at least a portion of available input data within the distributed system, the available input data being selected by data needed to make the decision;
- initiating a transfer of the set of predicted input data from the prediction system to a decision system within the distributed system;
- identifying, by the prediction system component, a time interval in which the transfer of the set of predicted input data is scheduled;
- receiving, by the decision system, the set of predicted input data;
- storing the received predicted input data; and
- computing the decision within the decision system at least partially based upon the received predicted input data.

* * * * *